US006954335B2

(12) United States Patent
Tsuyuki et al.

(10) Patent No.: US 6,954,335 B2
(45) Date of Patent: Oct. 11, 2005

(54) MAGNETIC TAPE CARTRIDGE

(75) Inventors: Seiji Tsuyuki, Kanagawa (JP); Hidetoshi Yamamoto, Kanagawa (JP); Hideaki Shiga, Kanagawa (JP); Naoki Okutsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 263 days.

(21) Appl. No.: 10/153,727

(22) Filed: May 24, 2002

(65) Prior Publication Data

US 2002/0181152 A1 Dec. 5, 2002

(30) Foreign Application Priority Data

| | | |
|---|---|---|
| May 29, 2001 | (JP) | 2001-159819 |
| Jun. 22, 2001 | (JP) | 2001-189589 |
| Jul. 6, 2001 | (JP) | 2001-206366 |
| Sep. 10, 2001 | (JP) | 2001-272989 |

(51) Int. Cl.$^{7}$ ........................ G11B 23/107; G11B 23/04
(52) U.S. Cl. ..................... 360/132; 242/343.2; 242/348
(58) Field of Search ....................... 360/132; 242/338.1, 242/343, 343.1, 343.2, 348

(56) References Cited

U.S. PATENT DOCUMENTS

| | | | | |
|---|---|---|---|---|
| 6,411,466 B1 | * | 6/2002 | Shima et al. | 360/132 |
| 6,462,905 B1 | * | 10/2002 | Takahashi et al. | 360/132 |
| 6,480,357 B1 | * | 11/2002 | Rambosek | 360/132 |
| 6,499,686 B2 | * | 12/2002 | Tsuyuki et al. | 242/348 |
| 6,745,968 B1 | * | 6/2004 | Schoettle et al. | 242/338.1 |
| 2004/0056132 A1 | * | 3/2004 | Tsuyuki et al. | 242/348 |

FOREIGN PATENT DOCUMENTS

| | | | | |
|---|---|---|---|---|
| EP | 1054403 A1 | * | 11/2000 | G11B/23/107 |
| EP | 1098320 A2 | * | 5/2001 | G11B/23/107 |
| JP | 11238352 A | * | 8/1999 | G11B/23/107 |
| JP | 11260033 A | * | 9/1999 | G11B/23/107 |
| JP | 11297035 A | * | 10/1999 | G11B/23/107 |
| JP | 11297036 A | * | 10/1999 | G11B/23/107 |
| JP | 2000339909 A | * | 12/2000 | G11B/23/107 |
| JP | 2000339910 A | * | 12/2000 | G11B/23/107 |
| JP | 2000339911 A | * | 12/2000 | G11B/23/107 |
| JP | 2002-023338 | | 1/2001 | |

* cited by examiner

*Primary Examiner*—William J Klimowicz
(74) *Attorney, Agent, or Firm*—Sughrue Mion, PLLC

(57) ABSTRACT

A magnetic tape cartridge comprises: a reel 2 around which a magnetic tape MT is wound; a cartridge case 1 for accommodating the reel 2 in a locked state; and a release pad 5 inserted into a cup-shaped hub 2A of the reel 2 in a locked state of the reel 2. The release pad 5 includes a pad body 5A having a plurality of corners to be faced proximately to the inner peripheral surface 2C of the cup-shaped hub 2A, and a plurality of lock releasing pins 5B projecting downwardly from a bottom surface of the pad body 5A at the respective corners and inserted through a bottom surface of the cup-shaped hub 2A. The release pad 5 is provided with a flank 5E extending from each corner downwardly through the respective lock release pin 5B so that an assembling clearance is formed with respect to an inner periphery of a flange 2G position in an open side of the cup-shaped hub 2A.

2 Claims, 15 Drawing Sheets

MAGNETIC TAPE CARTRIDGE

FIELD OF THE INVENTION

The present invention relates to a magnetic tape cartridge. More particularly, the present invention relates to a magnetic tape cartridge, which ensures assembly of a release pad that releases a locked state of the reel.

BACKGROUND OF THE INVENTION

As a magnetic tape cartridge utilized for an external memory medium for backup of a data of a computer and the like, there is a conventionally known magnetic tape cartridge that satisfies a so-called LTO (Linear Tape Open) standard. Such a magnetic tape cartridge comprises a cartridge case separately formed by a lower half and an upper half, and a single reel winding a magnetic tape is accommodated in the cartridge case. A tape-leading opening for pulling out the magnetic tape is provided at one side of the cartridge case extending over the lower and the upper halves, and a leader pin connected at the end of the magnetic tape is engaged at the tape-leading opening in such a manner that the magnetic tape is pulled out from the opening. Further, an opening for driving the reel is formed in the lower half of the cartridge case so that a hub of the reel is exposed to view from the opening.

A drive device loading the magnetic tape cartridge performs recording and playback of the data by pulling out the leader pin from the cartridge case and winding off the magnetic tape from the reel. Recording and playback of the data is also performed by rotatively driving the hub through the opening for driving the reel of the lower half to rewind the magnetic tape in the reel. The reel rotates only when the magnetic tape cartridge is loaded into the drive device. For the purpose of preventing undesirable rotation of the reel while the magnetic tape cartridge is not loaded into the drive device, a lock plate for locking the reel and a release pad for releasing or disengaging the locked state of the reel are arranged in the cup-shaped hub of the reel.

The lock plate is a disk-like or cup-shaped member and is provided at the lower periphery of the bottom portion with a hub-side engaging portion to be engagable with a corresponding engaging portion projecting from the inner bottom surface of the cup-shaped hub of the reel, and at the upper center of the bottom portion with a half-side engaging portion engaging with an engaging portion projecting from the center of the upper half of the cartridge case. A compression coil spring is positioned between the upper half and the lock plate so that the lock plate is urged by the resilient force of the coil spring and the hub-side engaging portion is brought into engagement with the engaging portion of the cup-shaped hub to thereby lock the reel.

Meanwhile, the release pad is a plate-like member positioned between the inner bottom surface of the cup-shaped hub and the lock plate and substantially in the shape of triangle, quadrangle, star or propeller. At each corner of the release pad that faces proximately to the inner peripheral surface of the cup-shaped hub, a lock releasing pin projects downwardly and extends through the bottom surface of the cup-shaped hub. When the magnetic tape cartridge is loaded into the drive device and the cup-shaped hub is rotatively driven by the reel driving mechanism (not shown) of the drive device, each of the lock releasing pins of the release pad is urged in the direction of the lock plate to press the lock plate toward the upper half against the compression coil spring, thereby releasing the engagement between the hub-side engaging portion of the lock plate and the engaging portion of the cup-shaped hub to unlock the locked state of the reel.

One example of the lock plate and the release pad of a conventional magnetic tape cartridge will be described with reference to FIG. 15. As shown in FIG. 15, the lock plate 10 is a cup-shaped member and is provided at the lower periphery of the bottom portion 10B with a hub-side engaging portion 10A to be engagable with a corresponding engaging portion 11C inwardly projecting from the bottom portion 11B of the cup-shaped hub 11A of the reel 11, and at the inner (upper) center of the bottom portion 10B with a half-side engaging portion 10C engaging with an engaging portion 12 projecting from the center of the upper half of the cartridge case. A compression coil spring 13 is positioned between the upper half and the lock plate 10 so that the lock plate 10 is urged by the resilient force of the coil spring 13 and the hub-side engaging portion 10A is brought into engagement with the engaging portion 11C of the cup-shaped hub 11A to thereby lock the reel 11.

Meanwhile, the release pad 14 is a propeller-shaped plate-like member and comprises a disk-shaped center portion 14A, three arm portions 14B extending outwardly from the center portion 14A, and three lock releasing pins 14C extending downwardly from the respective ends of the arm portions 14B. Each lock releasing pin 14C has a rectangular outer profile at its lower end surface 14D. The three lock releasing pins 14C are inserted into corresponding three rectangular through-holes 11D formed in the bottom portion 11B of the cup-shaped hub 11A and the lower end surfaces 14D project from the lowermost surface of the bottom portion 11B of the cup-shaped hub 11A. When the magnetic tape cartridge is loaded into the drive device and the cup-shaped hub 11A is rotatively driven by the reel driving mechanism (not shown) of the drive device, each lower end surface 14D of the lock releasing pins 14C is urged toward the upper half to press the lock plate 10 toward the upper half against the compression coil spring 13, thereby releasing the engagement between the hub-side engaging portion 10A of the lock plate 10 and the engaging portion 11C of the reel 11 to unlock the locked state of the reel 11.

Herein, as a general structure of the reel, a flange is welded at the opening side of the cup-shaped hub. Since the flange is normally spigot-fitted into the inner peripheral wall of the cup-shaped hub, the inner periphery of the flange slightly extends inwardly compared with the inner peripheral wall of the cup-shaped hub. For this reason, when the release pad is assembled with the cup-shaped hub of the reel during the assembly of the magnetic tape cartridge, the release pad is tilted and inserted into the hub so as not to contact with the inner periphery of the flange, and then dropped in a certain position with each of the lock releasing pins positioned with respect to the through-holes formed in the bottom portion of the cup-shaped hub.

When doing so, normally, the release pad is held with each lock releasing pin facing downward and one side (edge) of the pad body connecting two corners thereof being tilted forwardly. In other words, the release pad is inserted into the cup-shaped hub from one side (edge) of the pad body with the front side (edge) thereof being lowered, and thereafter the rear side is lowered to reduce gradually the inclination angle of the release pad. At the same time, positioning is carried out between two of the front side lock releasing pins and the plurality of through-holes formed in the bottom portion of the cup-shaped hub. When the release pad is dropped onto the bottom surface of the cup-shaped hub while retaining the relative position of the release pad, each of the lock releasing pins pierces through the corresponding through-holes of the cup-shaped hub so as to ensure the assembly of the release pad and the cup-shaped hub.

Meanwhile, during the assembly of the magnetic tape cartridge as illustrated in FIG. 15, if a robot assembles the release pad 14 with respect to the cup-shaped hub 11A of the reel 11, the robot holds the release pad 14 and inserts the lock releasing pins 14C into square holes 11D as the through-holes of the cup-shaped hub 11A. In this event, in order to carry out positioning of the lock releasing pins 14C with respect to the square holes 11D, at least either positions of the lock releasing pins 14C or positions of the square holes 11D are calculated through image processing.

In the image processing, for example, when the square holes 11D of the reel 11 are positioned to a certain position, the square holes 11D as the through-holes are pictured by a stationary camera for image processing and each central point of the square holes 11D is calculated by the image processing device. And based on these calculated central points, the deviation of the angle from the regular position of the reel 11 is calculated. The reel 11 is rotated by a device arranged below the belt conveyor in such a manner that the deviation of the angle can be corrected and positioning can be carried out. Also, when the lock releasing pins 14C of the release pad 14 are positioned to a certain position, the lower end surfaces 14D thereof are pictured by the camera, and based on the picture data, the robot rotates the release pad 14 to carry out positioning.

However, since the through-holes are arranged proximately to the inner peripheral wall of the cup-shaped hub pursuant to a circumferential arrangement having a certain diameter defined by LTO standard, it is difficult to ensure positioning of the lock releasing pins of the release pad, which are inserted into the cup-shaped hub in a tilted manner, with respect to the through-holes of the reel. If the assembly is carried out by the use of an assembling robot, the release pad would be assembled defectively.

Further, pluralities of reinforcement ribs are usually projecting at the inner peripheral wall of the cup-shaped hub, and especially, the ribs arranged proximately to the through-holes are adjacent to the pad body of the release pad when the release pad is assembled with the cup-shaped hub. Therefore, when the release pad is inserted into the cup-shaped hub from one side (edge) of the pad body with the front side (edge) thereof being lowered, one front side (edge) of the pad body abuts to the ribs and positioning of the two lock releasing pins with respect to the corresponding through-holes would be insufficient, leading to defective assembly of the release pad. This is more serious when assembly of the release pad is carried out by the use of an assembling robot.

Meanwhile, as shown in FIG. 15, since in the conventional reel, the outer profile of each square hole 11D and the outer profile of the lower end surface 14D of each lock releasing pin 14C are in the shape of a rectangular, if the square holes 11D of the cup-shaped hub 11A and/or the lower end surfaces 14D of the release pad 14 are rotated and out of position from the certain regular position, the stationary camera for image processing pictures these outer profiles differently. For this reason, calculating the central points of the square holes 11D and the lower end surfaces 14D that are out of position from the certain regular position becomes complicated and it is difficult to prepare an image processing program.

In view of the above, the first object of the present invention is to provide a magnetic tape cartridge wherein assembly of the release pad is reliably carried out by an assembling robot. Further, the second object of the present invention is to provide a magnetic tape cartridge wherein the outer profile of each through-hole or the outer profile of each lock releasing pin is always the same irrespective of the position of the cup-shaped hub and the release pad so that the image processing program can be readily made.

SUMMARY OF THE INVENTION

The above first object of the present invention can be accomplished by a magnetic tape cartridge comprising:

a reel around which a magnetic tape is wound;

a cartridge case for accommodating the reel in a locked state; and a release pad inserted into a cup-shaped hub of the reel and releasing the locked state of the reel, the release pad including a pad body having a plurality of corners to be faced proximately to the inner peripheral surface of the cup-shaped hub, and a plurality of lock releasing pins projecting downwardly from a bottom surface of the pad body at the respective corners and inserted through a bottom surface of the cup-shaped hub, wherein the release pad is provided with a flank extending from each corner downwardly through the respective lock releasing pin so that an assembling clearance is formed with respect to an inner periphery of a flange positioned in an open side of the cup-shaped hub.

According to the above structure of the magnetic tape cartridge, upon assembling the release pad with respect to the cup-shaped hub of the reel, the flank of the release pad extending from each corner downwardly through the respective lock releasing pins of the release pad ensures an assembling clearance between each corner of the release pad and the inner periphery of the flange arranged at the open side of the cup-shaped hub. Therefore, the release pad is inserted into the cup-shaped hub in a substantially non-tilted manner. Since the release pad is inserted into the cup-shaped hub while retaining a substantially horizontal posture that has been set previously, each lock releasing pin is reliably positioned with respect to the corresponding through-hole formed at the periphery of the bottom surface of the cup-shaped hub, so that the assembling robot ensures assembly of the release pad with respect to the cup-shaped hub.

Further, the above first object of the present invention can be accomplished by a magnetic tape cartridge comprising:

a reel around which a magnetic tape is wound;

a cartridge case for accommodating the reel in a locked state; and a release pad inserted into a cup-shaped hub of the reel and releasing the locked state of the reel, the release pad including a plate-like pad body accommodated in the cup-shaped hub, and a plurality of lick releasing pins projecting downwardly from a bottom surface of the pad body at the respective corners and inserted through a bottom surface of the cup-shaped hub, wherein the release pad is provided at an upper peripheral edge of the pad body with a flank extending proximately to each lock releasing pin so that an assembling clearance is formed with respect to ribs projecting from an inner periphery of the cup-shaped hub.

The pad body of the release pad may be substantially in the shape of triangle or quadrangle.

According to the above structure of the magnetic tape cartridge, upon assembling the release pad with respect to the cup-shaped hub of the reel, likewise the conventional magnetic tape cartridge, the release pad is inserted into the cup-shaped hub from one side (edge) of the pad body with the front side (edge) thereof being lowered, and thereafter the rear side is lowered to gradually reduce the inclination angle of the release pad. At the same time, positioning is carried out between two of the front side lock releasing pins and the corresponding through-holes formed in the bottom surface of the cup-shaped hub. When doing so, because the flank is provided at the upper peripheral edge of the pad body and proximately to each lock releasing pin, an assembling clearance is secured between one front side (edge) of the pad body and the ribs projecting from the inner periphery of the cup-shaped hub. As the result, an interference between one front edge of the pad body and the ribs at the inner periphery of the cup-shaped hub is prevented, and so a reliable positioning is carried out between two of the front side lock releasing pins of the release pad and the through-holes formed in the bottom surface of the cup-shaped hub. When the release pad is dropped onto the bottom surface of the cup-shaped hub while retaining the relative position of the release pad, the lock releasing pins pierce through the corresponding through-holes of the cup-shaped hub so as to ensure the assembly of the release pad and the cup-shaped hub.

In the above magnetic tape cartridge, each corner of the release pad may be arcuate in shape and each flank may be formed avoiding the arcuate corners. Furthermore, the pad body may be provided with chuck insertion holes, through which a pinch chuck of an assembling robot is inserted, and each of the chuck insertion holes forms a pinch surface associating with one of the arcuate corners.

According to the above structure of the magnetic tape cartridge, the pad body is pinched in a reliable manner with the use of a pair of pinch chucks of the assembling robot.

Furthermore, the above second object of the present invention can be accomplished by a magnetic tape cartridge comprising:

a reel around which a magnetic tape is wound;

a cartridge case for accommodating the reel in a locked state, and p1 a release pad inserted into a cup-shaped hub of the reel and releasing the locked state of the reel, the release pad including a plurality of lock releasing pins inserted into through-holes formed in a cup-shaped hub of the reel, wherein at lest an outer profile of each of the through-holes or an outer profile of a lower end surface of each of the lock releasing pins is circular in shape.

According to the above structure of the magnetic tape cartridge, for example, if the outer profile of each through-hole formed in the bottom surface of the cup-shaped hub is circular in shape, a stationary camera for image processing will always picture the outer profile as a circle regardless of a relative position of the through-hole with respect to a predetermined regular position.

Meanwhile, if the outer profile of the lower end surface of each of the lock releasing pins is circular in shape, relative positions of the lock releasing pins are firstly pictured by the stationary camera while the release pad is retained horizontally. After positioning the lock releasing pins to the predetermined regular position, the release pad is dropped onto the cup-shaped hub. Since the stationary camera for image processing will always picture the outer profile of the lower end surface of each lock releasing pin as a circle regardless of relative positions of the lock releasing pins with respect to a predetermined regular position, a complicated image processing program is not required to carry out positioning of the release pad.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENTS

With reference to the attached drawings, preferred embodiments of a magnetic tape cartridge according to the present invention will be described.

First Embodiment

Figure 2:
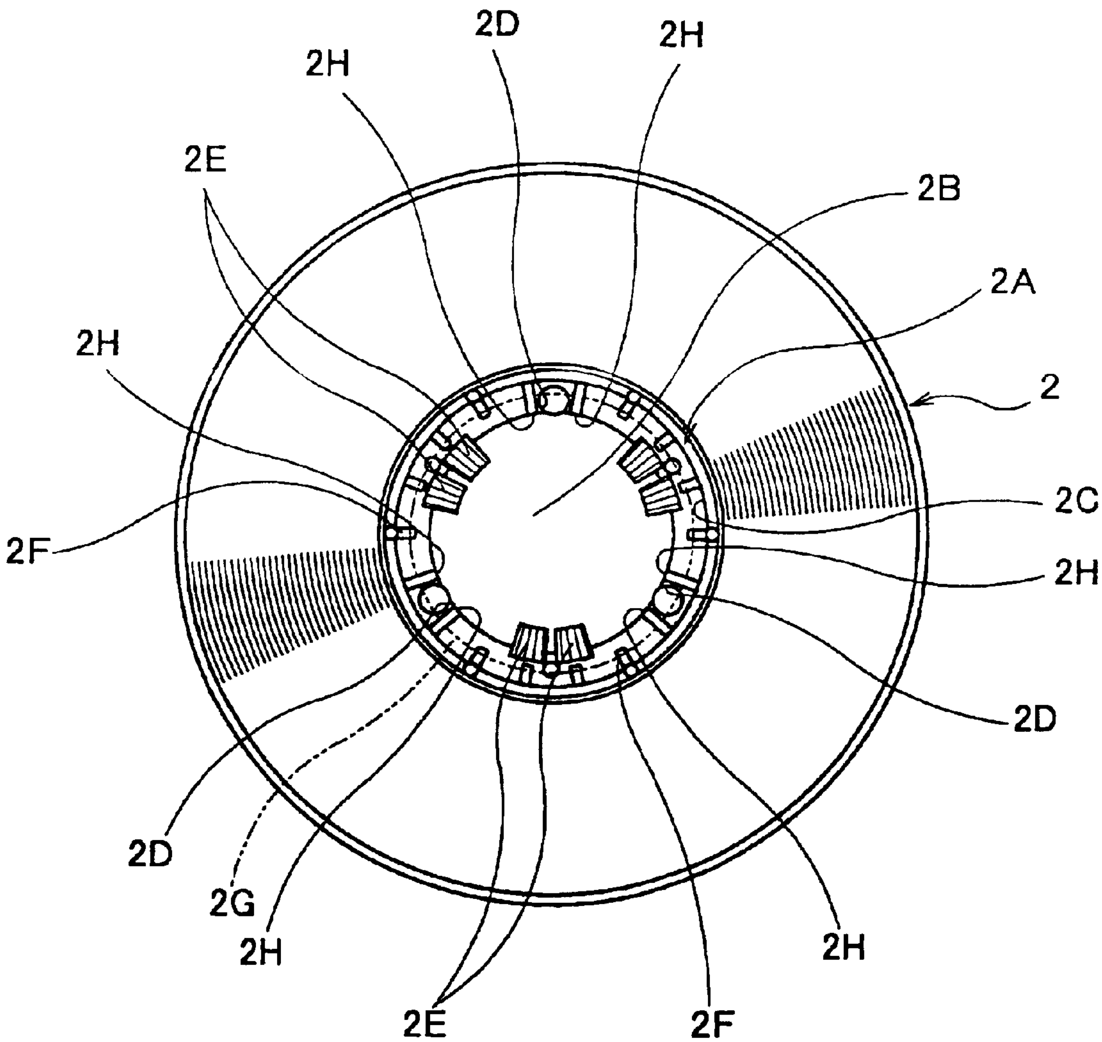
FIG. 2 is a plan view illustrating an internal structure of a cup-shaped hub of a reel shown in FIG. 1.
Figure 3:
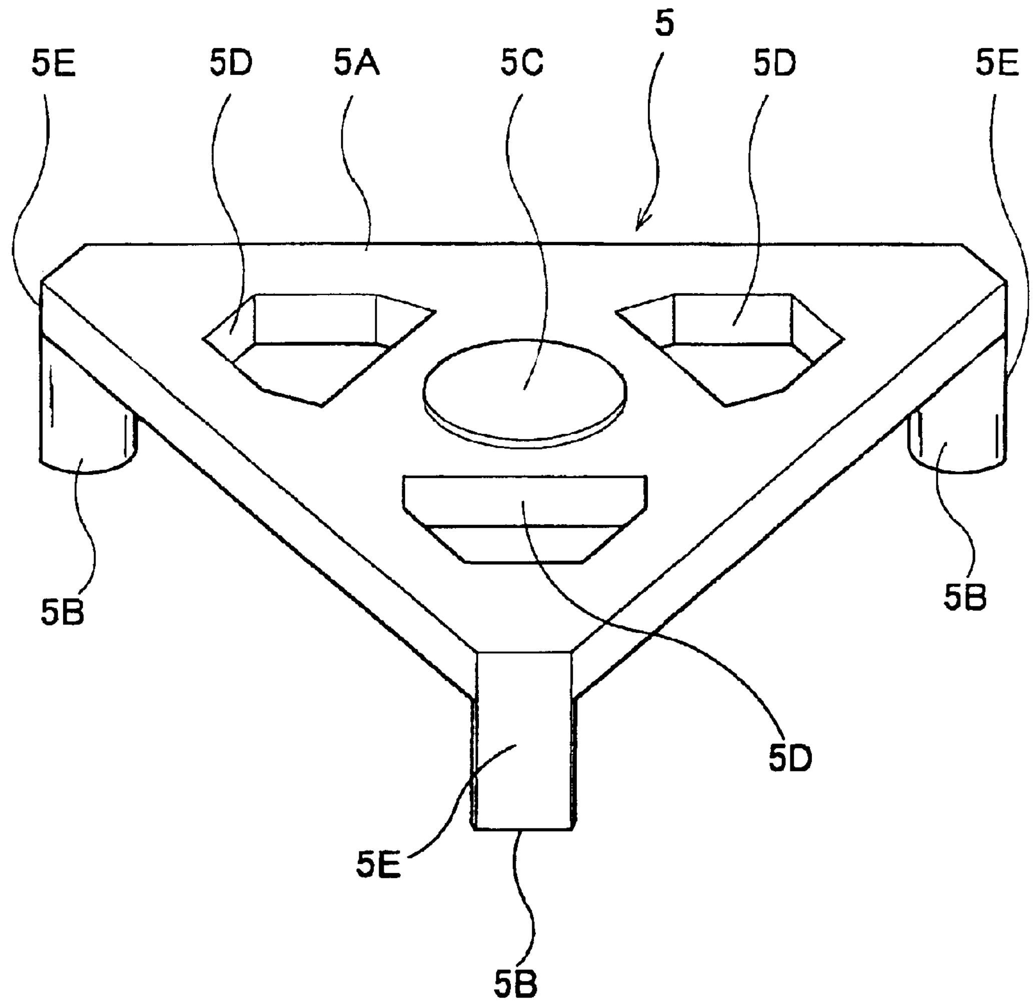
FIG. 3 is a perspective view illustrating a release pad shown in FIG. 1.

A magnetic tape cartridge according to a first embodiment will be described with reference to FIGS. 1 through 6. According to this magnetic tape cartridge, in order to ensure assembly of a release pad, the release pad is provided with a flank extending from each corner of a pad body through the respective lock releasing pins. As the drawings to be referred herein, FIG. 1 is an exploded perspective view illustrating structural elements of a magnetic tape cartridge according to the first embodiment of the present invention, FIG. 2 is a plan view illustrating an internal structure of a cup-shaped hub of a reel shown in FIG. 1, and FIG. 3 is a perspective view illustrating a release pad shown in FIG. 1.

The magnetic tape cartridge according to the first embodiment satisfies the LTO standard. As shown in FIG. 1, the magnetic tape cartridge comprises a cartridge case 1 separately formed by a lower half 1A and an upper half 1B, a single reel 2 previously winding a magnetic tape and accommodated in the cartridge case 1, a lock plate 3 for locking a rotation of the reel 2 and a compression coil spring 4, a release pad 5 for releasing or disengaging the locked state of the reel 2, a slide door 6 for opening and closing a tape-leading opening 1C which extends over the lower half 1A and the upper half 1B of the cartridge case 1, a torsion coil spring 7 for urging the slide door 6 to close the tape-leading opening 1C, a safety lug 8, and a cartridge memory chip 9.

The reel 2 includes a cup-shaped hub 2A at its center. The cup-shaped hub 2A opens toward the upper half 1B, and the release pad 5, the lock plate 3, and the compression coil spring 4 are in turn assembled in the cup-shaped hub 2A. Provided at the periphery of the bottom portion 2B of the cup-shaped hub 2A, i.e., at the proximity of an inner peripheral wall 2C, are three through-holes 2D (only one through-hole is shown in FIG. 1) for piercing lock releasing pins 5B projecting downwardly from a bottom surface of a pad body 5A of the release pad 5. As shown in FIG. 2, the through-holes 2D are arranged at equal intervals along a certain circumference with a predetermined radius based on the LTO standard and proximately to the inner peripheral wall 2C. Further, at the upper periphery of the bottom portion 2B of the cup-shaped hub 2A, there are provided three equidistant engaging portions (two engaging portions are shown in FIG. 1) between the three through-holes 2D and along the certain circumference of the through-holes 2D. Provided at the upper surface of each engaging portion is a toothed engaging surface 2E having radially extending bladed projections with a triangular section. Pluralities of reinforcement ribs 2F are provided on the inner peripheral wall 2C of the cup-shaped hub 2A. The reinforcement ribs 2F extend vertically and are arranged off the through-holes 2D.

Figure 1:
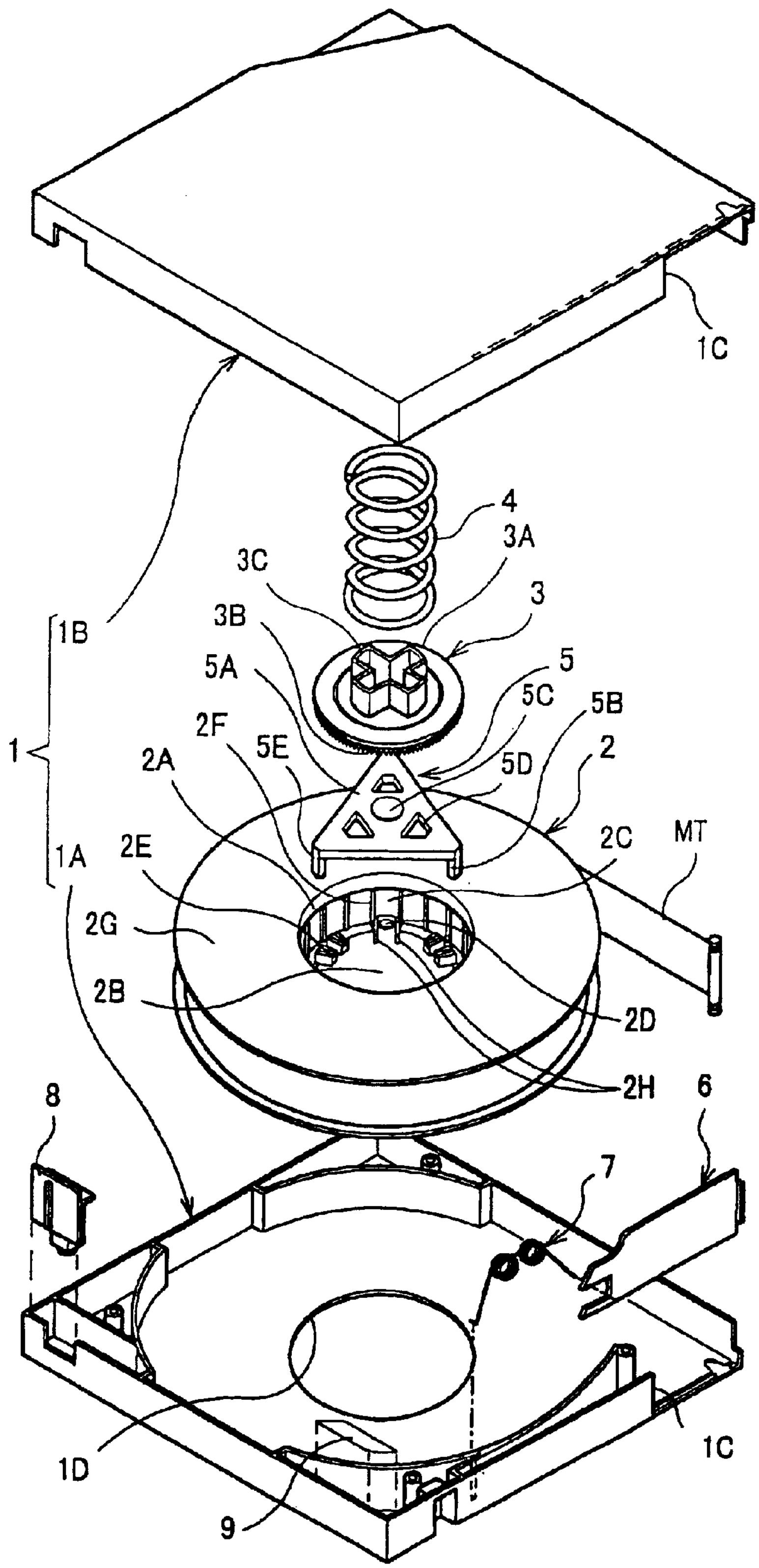
FIG. 1 is an exploded perspective view illustrating structural elements of a magnetic tape cartridge according to a first embodiment of the present invention.
Figure 5:
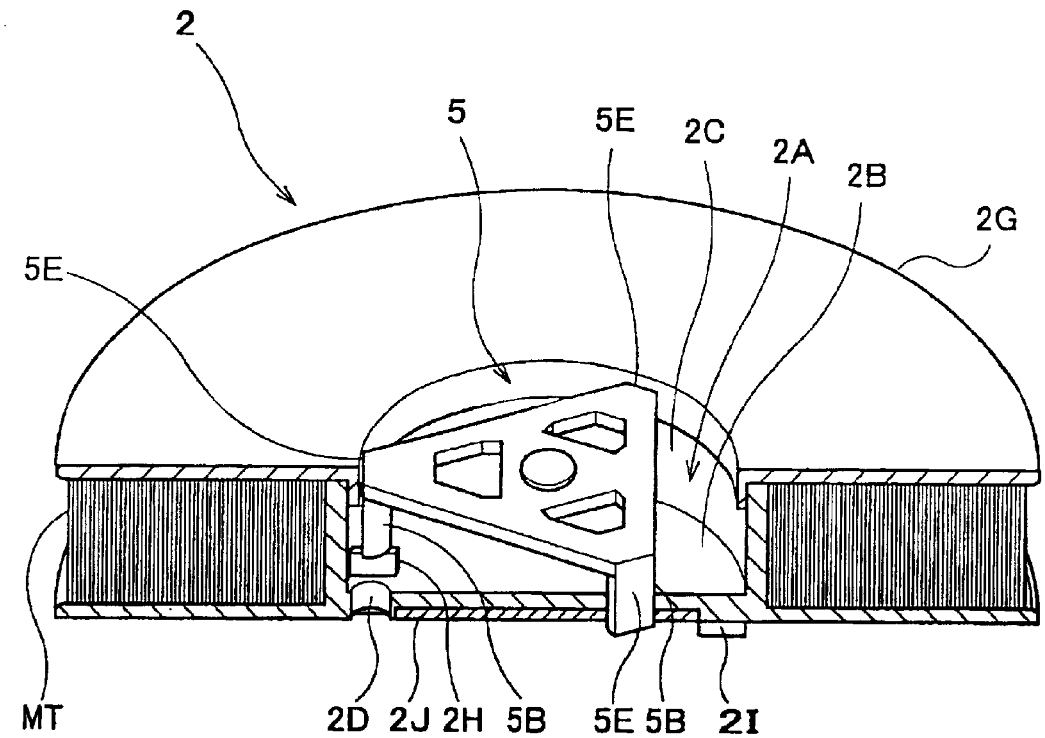
FIG. 5 is an explanatory perspective view illustrating assembly of the release pad with respect to the cup-shaped hub of the reel.

As shown in FIG. 1, a flange 2G is welded at the open side of the cup-shaped hub 2A of the reel 2. As best seen in FIG. 5, the inner periphery of the flange 2G is spigot-fitted into the inner peripheral wall 2C of the cup-shaped hub 2A, and therefore, as illustrated by the two-dotted phantom line of FIG. 2, the inner periphery of the flange 2G inwardly projects from the inner peripheral wall 2C of the cup-shaped hub 2A and reaches above the through-holes 2D. Further, a pair of guide ribs 2H is provided on the bottom portion 2B of the cup-shaped hub 2A and at both ends of each through-hole 2D so that the release pad 5 to be lowered toward the through-holes 2D (see FIG. 1) is guided with each lock releasing pin 5B guided by the guide ribs 2H. The height of each pair of guide ribs 2H is set to be lower than the toothed engaging surface 2E so that a toothed engaging surface 3B formed on the bottom surface of the lock plate 3 (see FIG. 1) does not interfere with the guide ribs 2H.

As shown in FIG. 1, the bottom surface of the bottom portion 2B of the cup-shaped hub 2A is exposed to view from the cartridge case 1 through a circular opening 1D formed at the center of the lower half 1A, and as best seen in FIG. 5, a contrate gear 2I is formed around the lower periphery of the bottom portion 2B. The through-holes 2D are formed within the width of the contrate gear 2I. Further, a metal plate 2J is inserted within the contrate gear 2I. The contrate gear 2I is meshed with a contrate gear of a reel driving mechanism accommodated in a non-shown drive device, into which the magnetic tape cartridge is inserted, and the metal plate 2J is magnetically attracted by a magnet of the reel driving mechanism in the drive device. When doing so, the lock releasing pins 5B projecting from the through-holes 2D are urged toward the lock plate 3, and the lock plate 3 is forced to move toward the upper half 1B against the compression coil spring 4. The locked state of the reel 2 is thereby disengaged. The reel 2 is rotatively driven by the reel driving mechanism of the drive device.

As shown in FIG. 1, the lock plate 3 includes a circular plate body 3A to be accommodated within the cup-shaped hub 2A of the reel 2, and at the periphery of its bottom surface, there is provided a toothed engaging surface 3B having radially extending bladed projections with a triangular section and engagable with the toothed engaging surface 2E of the cup-shaped hub 2A. Further, at the center of the upper surface of the plate body 3A, there is provided a crisscross engaging recess portion 3C, into which non-shown engaging projections formed at the center of the upper half 1B are inserted. A compression coil spring 4 is fitted onto the engaging recess portion 3C and positions between the upper half 1B and the lock plate 3, so that the lock plate 3 is urged downward and the toothed engaging surface 3B thereof engages with the toothed engaging surfaces 2E of the cup-shaped hub 2A.

The release pad 5 includes a pad body 5A substantially in the form of an equilateral triangular plate and positioned between the bottom portion 2B of the cup-shaped hub 2A and the lock plate 3. Three pillar-shaped lock releasing pins 5B (only two lock releasing pins are shown in FIG. 1) project from the respective corners of the release pad 5. The lock releasing pins 5B are inserted into the three corresponding through-holes 2D (only one through-hole is shown in FIG. 1) of the cup-shaped hub 2A. Further, a spherical projection 5C is formed at the center of the pad body 5A. The spherical projection 5C point-contacts with a non-shown spherical projection formed at the center of the bottom surface of the plate body 3A of the lock plate 3. The pad body 5A of the release pad 5 is provided with three chuck-insertion holes 5D between the spherical projection 5C and each of the corners.

As shown in FIGS. 3 through 6, the release pad 5 is provided with a flank extending from each corner of the pad body 5A through the respective lock releasing pins 5B so that an assembling clearance is formed with respect to the inner periphery of the flange 2G (FIG. 5) arranged at the open side of the cup-shaped hub 2A. In the illustrated example, the flank 5E is formed as a flat surface extending along the axial direction of each lock releasing pin 5B, and by this flank 5E, each lock releasing pin 5B becomes semi-cylindrical in shape. The flank 5E may be formed as an arcuate convex surface which conforms to the inner periphery of the flange 2G.

Figure 4:
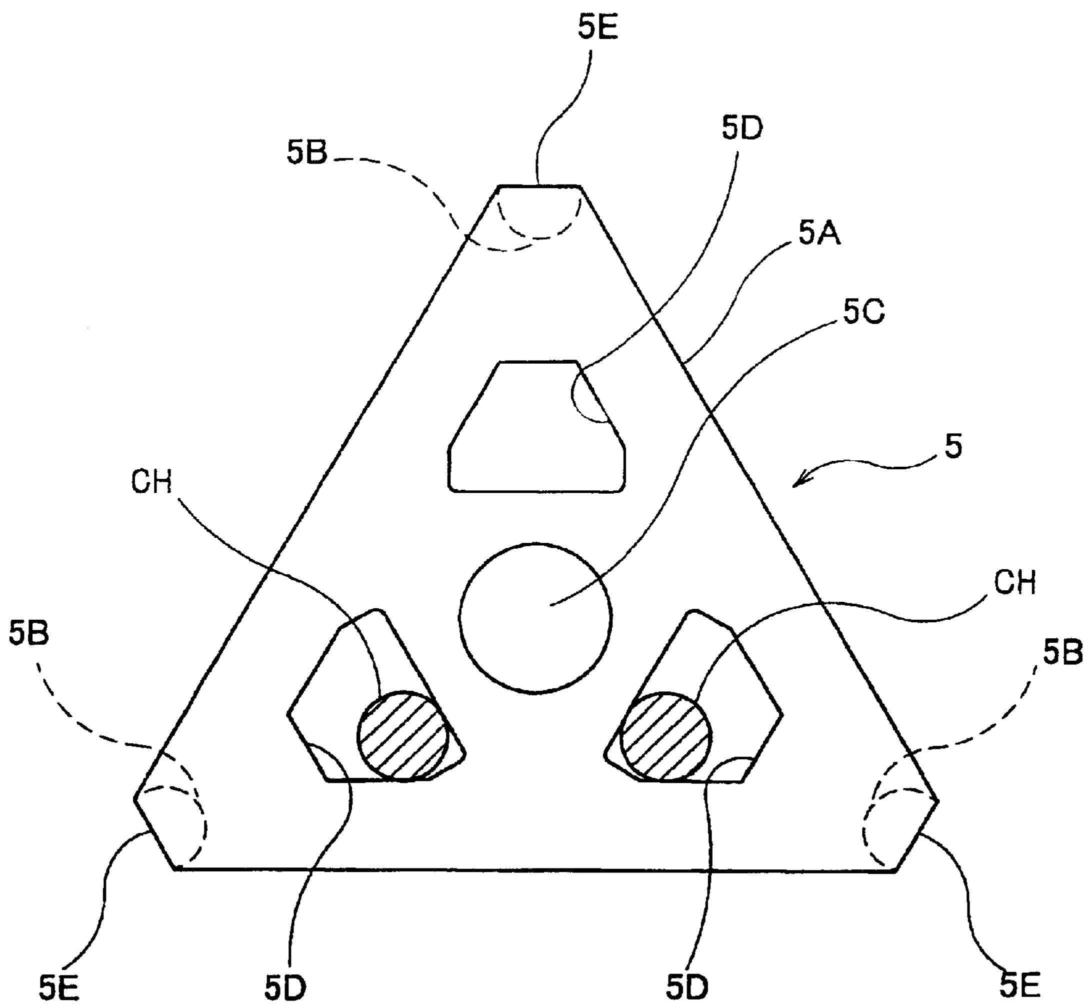
FIG. 4 is a plan view illustrating a holding state of the release pad during the assembling operation.

According to the aforementioned magnetic tape cartridge, a non-shown assembling robot assembles the release pad 5 in the cup-shaped hub 2A of the reel 2 shown in FIG. 1 during the assembling process. In the assembling operation, as shown in FIG. 4, the assembling robot inserts a pair of pinch chucks CH into the release pad 5 from the upper surface of the pad body 5A and through two chuck-insertion holes 5D, and holds the pad body 5A by closing the pair of pinch chucks CH. The assembling robot then moves the release pad 5 to right above the cup-shaped hub 2A of the reel 2, and keeps the pad body 5A in the horizontal position. In this position of the release pad 5, adjustment of each lock releasing pin 5B is carried out with respect to the corresponding through-hole 2D of the cup-shaped hub 2A.

Figure 6:
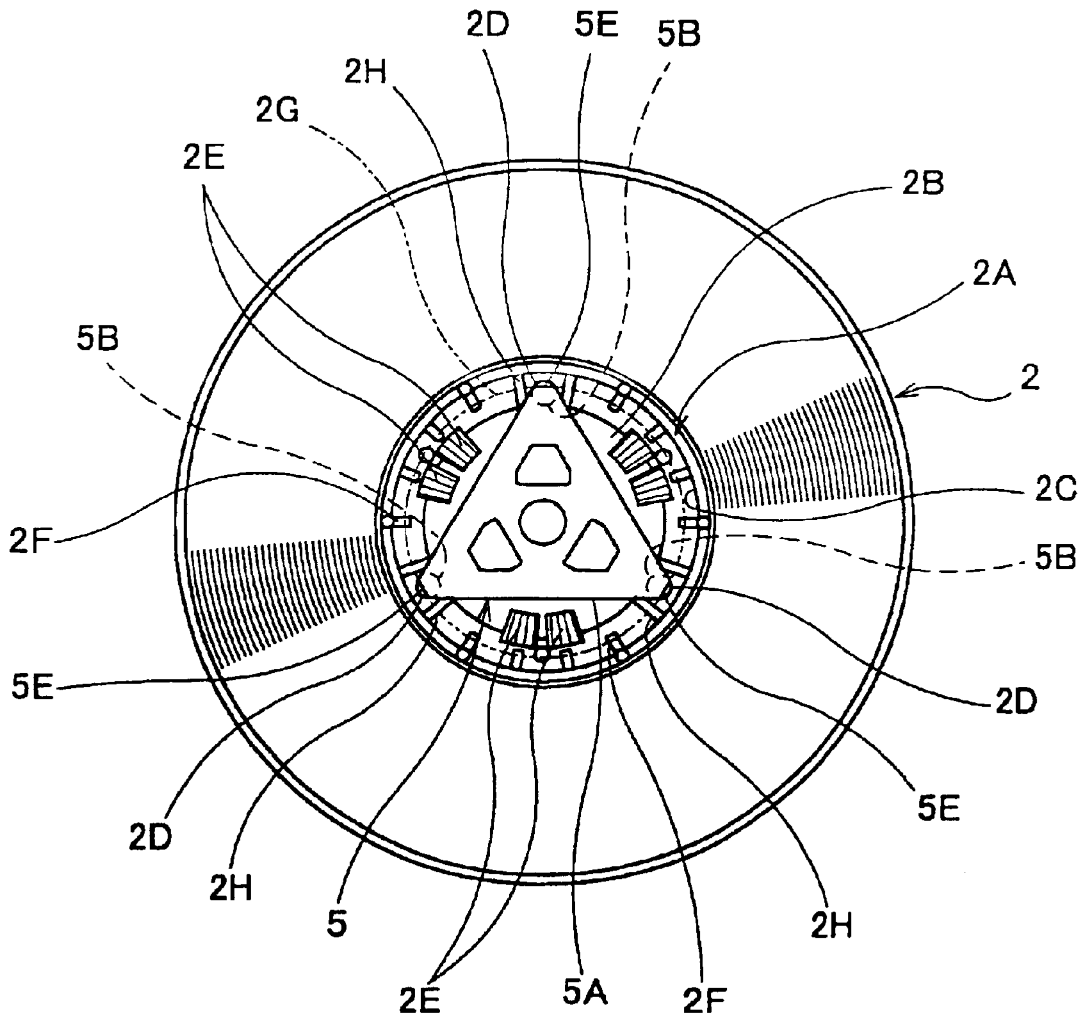
FIG. 6 is an explanatory plan view illustrating assembly of the release pad with respect to the cup-shaped hub of the reel.

Subsequently, the assembling robot lowers the release pad 5 into the cup-shaped hub 2A while retaining the pad body 5A substantially in the horizontal assembling position. Since the release pad 5 is provided with a flank 5E extending from each corner through the respective lock releasing pins 5B so that an assembling clearance is formed with respect to the inner periphery of the flange 2G of the reel 2, as shown in FIGS. 5 and 6, the release pad 5 is accurately inserted into the cup-shaped hub 2A without interfering with the inner periphery of the flange 2G.

Upon lowering the release pad 5 into the cup-shaped hub 2A, the assembling robot moves the lock releasing pins 5B toward the corresponding through-holes 2D. The pair of guide ribs 2H arranged at both sides of each through-hole 2D guides each lock releasing pin 5B into the corresponding through-hole 2D.

The assembling robot then opens the pair of pinch chucks CH to disengage the hold of the pad body 5A, so that the release pad is dropped onto the bottom portion 2B of the cup-shaped hub 2A. Accordingly, the three lock releasing pins 5B of the release pad 5 are accurately inserted into the corresponding through-holes 2D, thereby ensuring a reliable assembly of the release pad 5 with respect to the cup-shaped hub 2A.

In the above magnetic tape cartridge according to the first embodiment, the pad body 5A of the release pad 5 is formed in the shape of an equilateral triangular plate. However, other than equilateral triangle, the pad body 5A may be formed in the shape of square, star or propeller. Furthermore, the cross-section of each through-hole 2D, through which the lock releasing pin 5B of the release pad 5 is inserted, is not necessary to be circular in shape, and a quadrangular or triangular through-hole or a through-hole having an analogous cross-section with the lock releasing pin 5B, which enhances dust proofing characteristics, may be employed.

Second Embodiment

Figure 8:
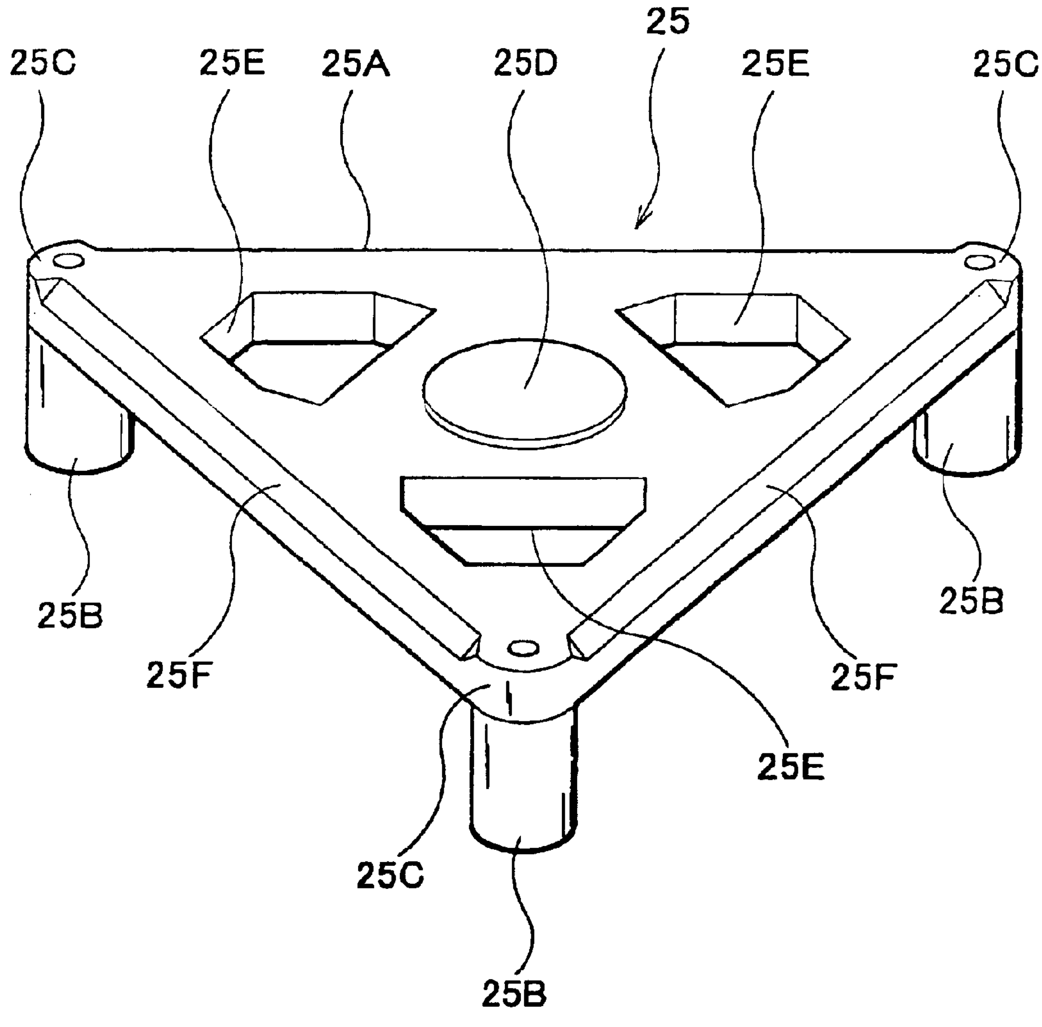
FIG. 8 is an enlarged perspective view illustrating a release pad shown in FIG. 7.
Figure 9:
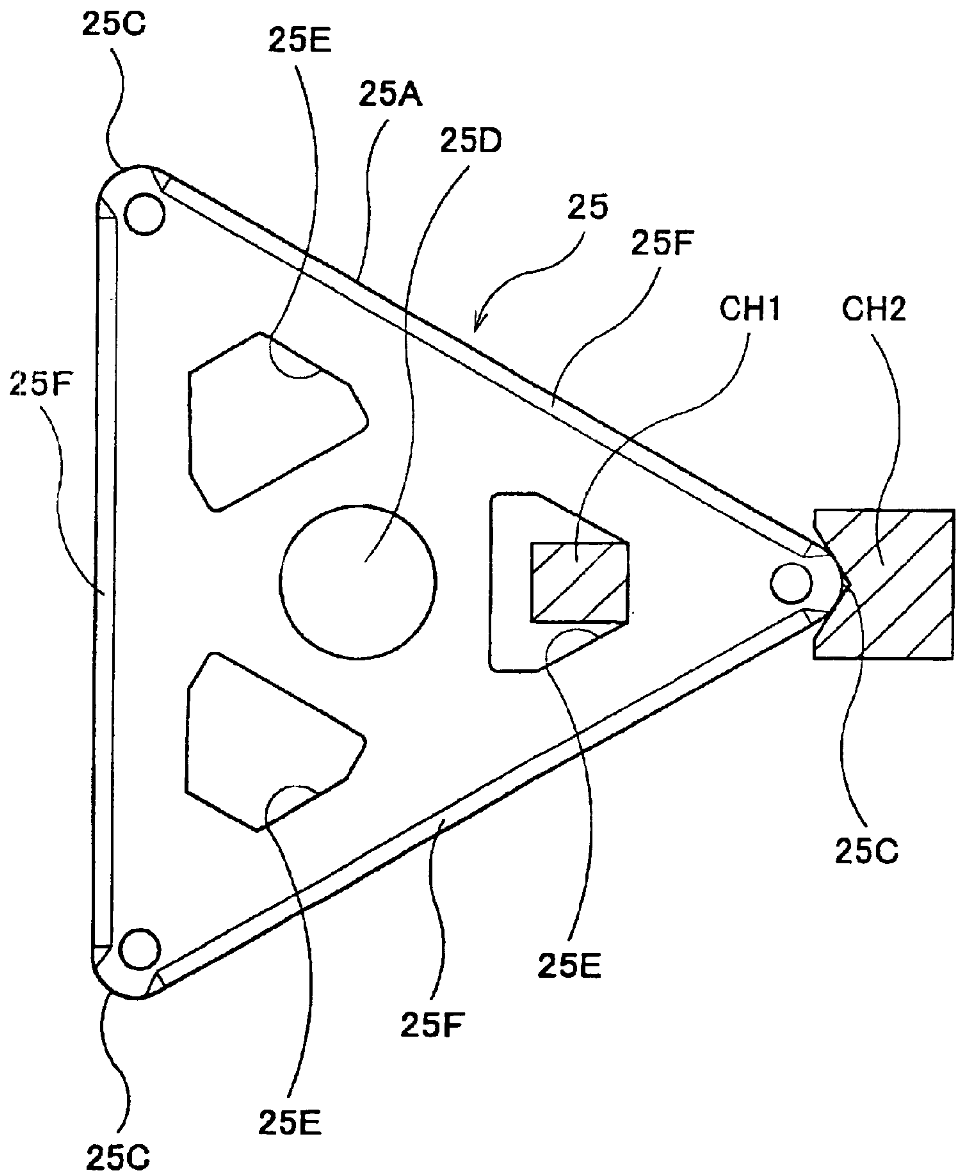
FIG. 9 is an enlarged plan view illustrating the release pad.

A magnetic tape cartridge according to a second embodiment of the present invention will be described with reference to FIGS. 7 through 11. According to this magnetic tape cartridge, in order to ensure assembly of a release pad, a pad body of the release pad is provided with a flank at its upper peripheral edge. As the drawings to be referred herein, FIG. 7 is an exploded perspective view illustrating structural elements of a magnetic tape cartridge according to the second embodiment of the present invention, FIG. 8 is an enlarged perspective view illustrating a release pad shown in FIG. 7, and FIG. 9 is an enlarged plan view illustrating the release pad.

Likewise the magnetic tape cartridge according to the first embodiment shown in FIG. 1, the magnetic tape cartridge according to the second embodiment satisfies the LTO standard. As shown in FIG. 7, the magnetic tape cartridge comprises a cartridge case 1 separately formed by a lower half 1A and an upper half 1B, a single reel 22 previously winding a magnetic tape and accommodated in the cartridge case 1, a lock plate 3 for locking a rotation of the reel 22 and a compression coil spring 4, a release pad 25 for releasing or disengaging the locked state of the reel 22, a slide door 6 for opening and closing a tape-leading opening 1C which extends over the lower half 1A and the upper half 1B of the cartridge case 1, a torsion coil spring 7 for urging the slide door 6 to close the tape-leading opening 1C, a safety lug 8, and a cartridge memory chip 9.

Figure 10:
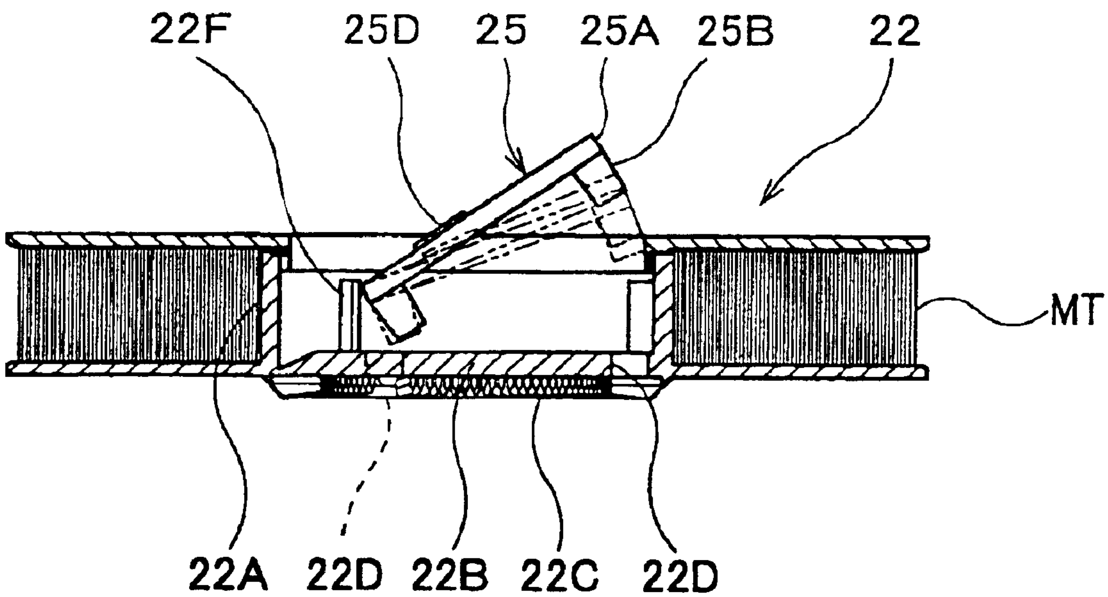
FIG. 10 is an explanatory sectional view along the diametrical direction of a reel shown in FIG. 7 and illustrating assembly of the release pad with respect to a cup-shaped hub of the reel.
Figure 11:
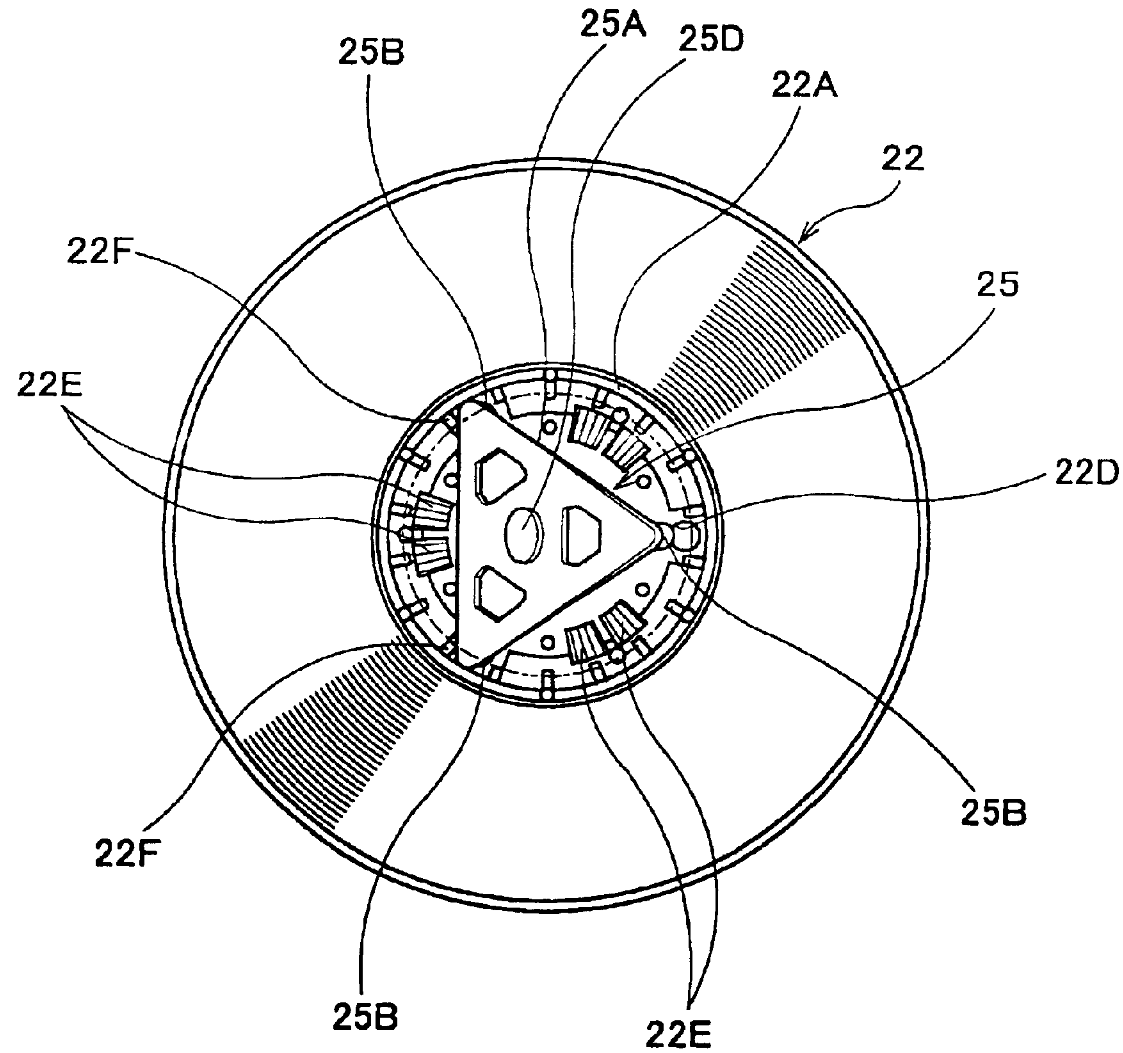
FIG. 11 is an explanatory plan view of the reel illustrating assembly of the release pad with respect to the cup-shaped hub of the reel.

The reel 22 includes a cup-shaped hub 22A at its center. The cup-shaped hub 22A opens toward the upper half 1B, and the release pad 25, the lock plate 3, and the compression coil spring 4 are in turn assembled in the cup-shaped hub 22A. The bottom surface of the bottom portion 22B of the cup-shaped hub 22A is exposed to view from the cartridge case 1 through a circular opening 1D formed at the center of the lower half 1A, and as best seen in FIG. 10, a contrate gear 22C is formed around the lower periphery of the bottom portion 22B. The contrate gear 22C is meshed with a contrate gear of a reel driving mechanism accommodated in a non-shown drive device, into which the magnetic tape cartridge is inserted. A metal plate is inserted within the contrate gear 22C so as to be magnetically attracted by a magnet of the non-shown drive device.

Figure 7:
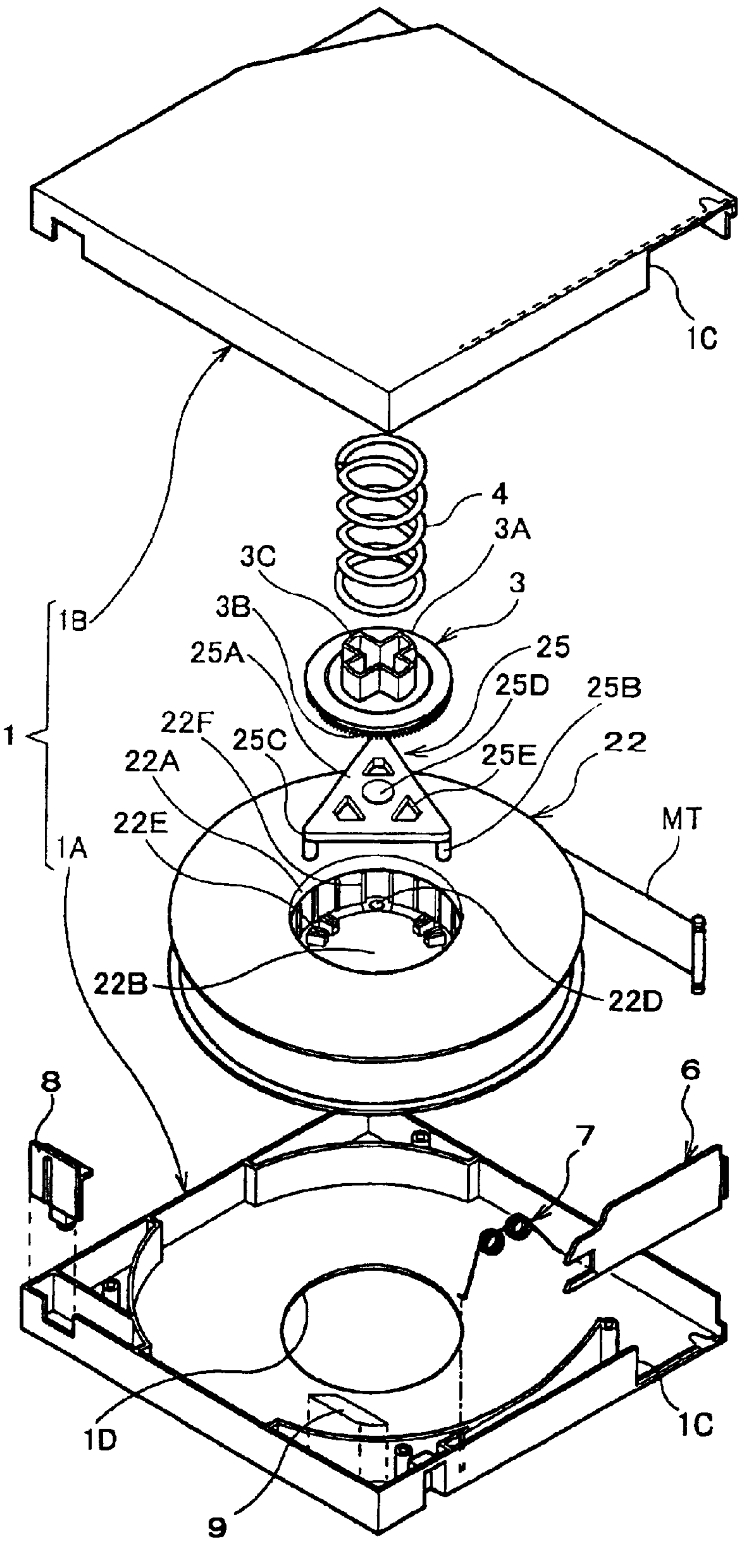
FIG. 7 is an exploded perspective view illustrating structural elements of a magnetic tape cartridge according to a second embodiment of the present invention.

As shown in FIG. 7, provided at the bottom portion 22B of the cup-shaped hub 22A of the reel 22 are three through-holes 22D (only one through-hole is shown in FIG. 7) for piercing lock releasing pins 25B projecting downwardly from a bottom surface of a pad body 25A of the release pad 25. The through-holes 22D are arranged at equal intervals along a certain circumference with a predetermined radius based on the LTO standard and proximately to the inner peripheral wall of the cup-shaped hub 22A. The through-holes 2D are formed within the width of the contrate gear 22C. Further, at the upper periphery of the bottom portion 22B of the cup-shaped hub 22A, there are provided three equidistant engaging portions (two engaging portions are shown in FIG. 7) between the three through-holes 22D and along the certain circumference of the through-holes 22D. Provided at the upper surface of each engaging portion is a toothed engaging surface 22E having radially extending bladed projections with a triangular section. Pluralities of vertically extending reinforcement ribs 22F are provided on the inner peripheral wall of the cup-shaped hub 22A. The reinforcement ribs 22F are arranged off the through-holes 22D.

The lock plate 3 includes a circular plate body 3A to be accommodated within the cup-shaped hub 22A of the reel 22, and at the periphery of its bottom surface, there is provided a toothed engaging surface 3B having radially extending bladed projections with a triangular section and engagable with the toothed engaging surface 22E of the cup-shaped hub 2A. Further, at the center of the upper surface of the plate body 3A, there is provided a crisscross engaging recess portion 3C, into which non-shown four engaging projections formed at the center of the upper half 1B are inserted. A compression coil spring 4 is fitted onto the engaging recess portion 3C and positions between the upper half 1B and the lock plate 3, so that the lock plate 3 is urged downward and the toothed engaging surface 3B thereof engages with the toothed engaging surfaces 22E of the cup-shaped hub 22A.

The release pad 25 includes a pad body 25A substantially in the form of an equilateral triangular plate, each of which corner is formed arcuately, and positioned between the bottom portion 22B of the cup-shaped hub 22A and the lock plate 3. Three pillar-shaped lock releasing pins 25B (only two lock releasing pins are shown in FIG. 7) project from corners of the release pad 25 integrally with arcuate corners 25C of the release pad 25. The lock releasing pins 25B are inserted into the three corresponding through-holes 22D (only one through-hole is shown in FIG. 7) of the cup-shaped hub 22A. Further, a spherical projection 25D is formed at the center of the pad body 25A. The spherical projection 25D point-contacts with a non-shown spherical projection formed at the center of bottom surface of the plate body 3A of the lock plate 3. The pad body 25A of the release pad 25 is provided with three chuck-insertion holes 25E between the spherical projection 25D and each of the corners.

As shown in FIGS. 8 and 9, the release pad 25 is provided with a slanted cut surface 25F as a flank at respective upper peripheral edges of the pad body 25A so that an assembling clearance is formed with respect to the reinforcement ribs 22F provided on the inner periphery of the cup-shaped hub 22A. The slanted cut surface 25F is formed on the pad body 25A avoiding the arcuate corners 25C, viz. the slanted cut surface 25F is formed on the upper peripheral edges of the pad body 25A including the proximity of each lock releasing pin 25B. The angle of the slanted cut surface 25F is set in the range of, for example, between 30° and 60°.

According to the aforementioned magnetic tape cartridge, a non-shown assembling robot assembles the release pad 5 in the reel 22 of the cup-shaped hub 22A, around which a magnetic tape MT is wound, during the assembling process. As shown in FIG. 9, in the assembling operation, the assembling robot holds the pad body 25A with a pair of pinch chucks CH1, CH2. In other words, the pad body 25 is supported between the pinch chuck CH1 inserted through a chuck-insertion hole 25E provided at a mid-part of the pad body 25A and the pinch chuck CH2 abutting at its V-shaped groove to the arcuate corner 25C of the pad body 25A. In this event, the release pad 25 is held in such a manner that the respective lock releasing pins 25B face downward and one edge connecting two corners of the pad body 25A is lowered.

As shown in FIG. 10, the release pad 25, the pad body 25A of which is held with the pinch chucks CH1, CH2 of the non-shown assembling robot, is inserted into the cup-shaped hub 22A of the reel 22 from one edge of the pad body 25A with the front edge thereof being lowered, and thereafter the rear side is lowered to reduce gradually the inclination angle of the pad body 25A. At the same time, positioning is carried out between two of the front side lock releasing pins 25B and the corresponding through-holes 22D among the three through-holes 22D formed in the bottom portion 22B of the cup-shaped hub 22A. Since the slanted cut surface 25F is provided as a flank on the upper peripheral edges of the pad body 25A including the proximity of each lock releasing pin 25B, an assembling clearance is ensured between one front edge of the pad body 25A and the reinforcement ribs 22F projecting from the inner peripheral wall of the cup-shaped hub 22A, and particularly, between the reinforcement ribs 22F adjacent to the lock releasing pin 25B and one front edge of the pad body 25A. As a result, it is possible to prevent interference between one front edge of the pad body 25A and the reinforcement ribs 22F on the inner peripheral wall of the cup-shaped hub 22A, and accurate positioning is carried out between two of the front side lock releasing pins 25B of the release pad 25 and the corresponding through-holes 22D formed in the bottom portion 22B of the cup-shaped hub 22A.

While retaining the relative position of the release pad 25, the pair of pinch chucks CH1 and CH2 shown in FIG. 9 open so that the release pad 25 is dropped onto the bottom portion 22B of the cup-shaped hub 22A. Therefore, three lock releasing pins 25B are inserted into the corresponding three through-holes 22D formed in the bottom portion 22B of the cup-shaped hub 22A, which ensures assembly of the release pad 25 with respect to the cup-shaped hub 22A.

In the above magnetic tape cartridge according to the second embodiment, the pad body 25A of the release pad 25 is formed substantially in the shape of an equilateral triangular plate having linear sides (edges). However, each of the sides (edges) may be curved slightly outwardly or inwardly. Furthermore, the shape of the pad body 25A is not limited to an equilateral triangle, and a square plate-like pad body 25A having arcuate corners may be employed. In this instance, each of the sides (edges) may be curved slightly outwardly or inwardly.

Furthermore, in the magnetic tape cartridge according to the second embodiment, as a flank which ensures an assembling clearance with respect to the reinforcement ribs 22F projecting from the inner peripheral wall of the cup-shaped hub 22A, the slanted cut surface 25F is formed on the upper peripheral edges of the pad body 25A of the release pad 25. However, the flank may be formed as a cut surface having an arcuate convex cross-section. Moreover, it is not necessary to form a flank as a continuous linear line extending over the respective sides (edges) of the pad body 25. The flank may be formed as a cutout adjacent to the proximity of each lock releasing pin 25B.

Third Embodiment

Figure 12:
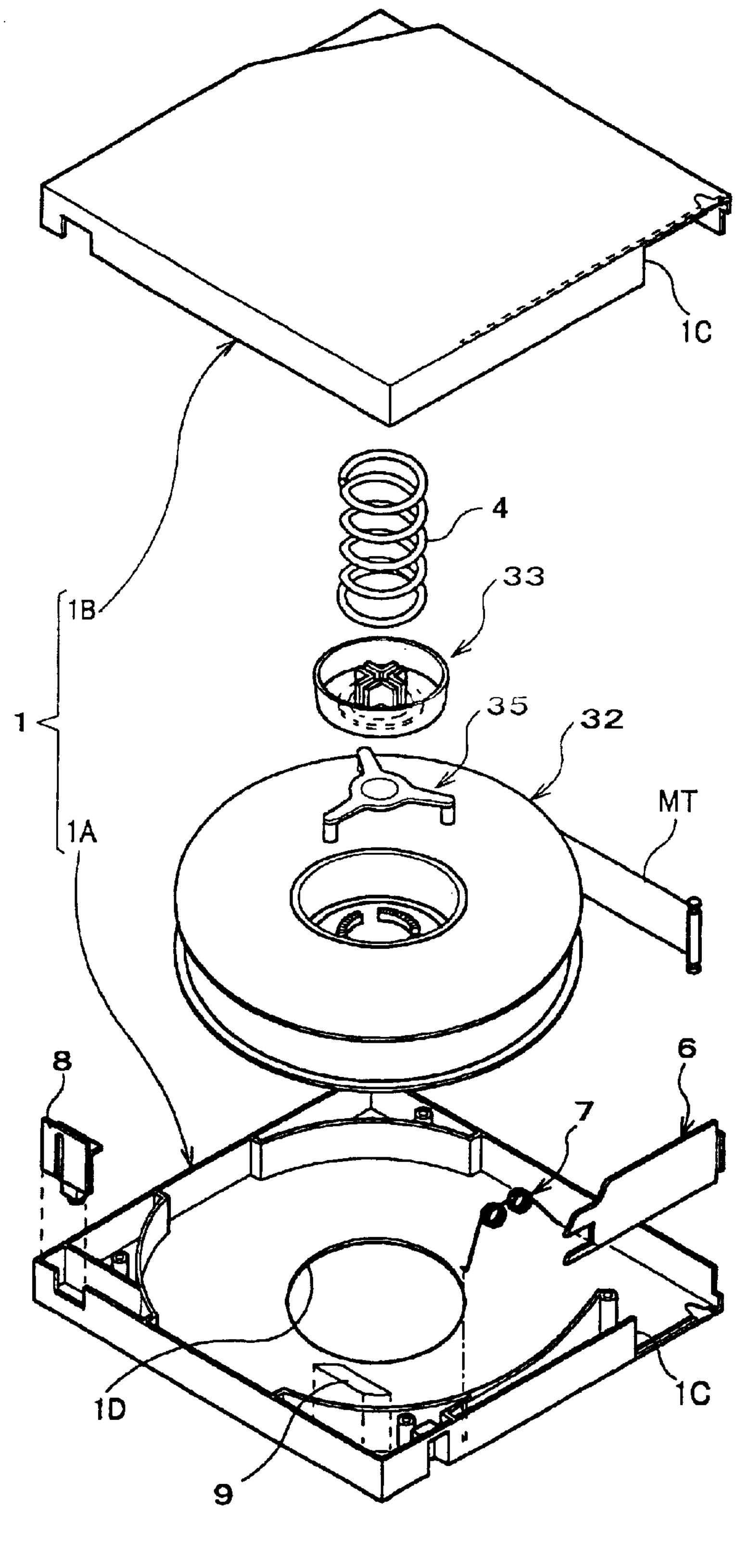
FIG. 12 is an exploded perspective view illustrating structural elements of a magnetic tape cartridge according to a third embodiment of the present invention.

A magnetic tape cartridge according to a third embodiment of the present invention will be described with reference to FIGS. 12 through 14. According to this magnetic tape cartridge, in order to facilitate relative positioning between a release pad and a reel, at least an outer profile of each through-hole formed in a bottom surface of a cup-shaped hub of the reel or an outer profile of a lower end surface of each lock releasing pin of the release pad is circular in shape. As the drawings to be referred herein, FIG. 12 is an exploded perspective view illustrating structural elements of a magnetic tape cartridge according to the third embodiment of the present invention, and FIG. 13 is an enlarged exploded perspective view illustrating a main structure of the magnetic tape cartridge shown in FIG. 12.

Likewise the magnetic tape cartridge according to the first embodiment shown in FIG. 1, the magnetic tape cartridge according to the third embodiment satisfies the LTO standard. As shown in FIG. 12, the magnetic tape cartridge comprises a cartridge case 1 separately formed by a lower half 1A and an upper half 1B, a single reel 32 previously winding a magnetic tape and accommodated in the cartridge case 1, a lock plate 33 for locking a rotation of the reel 32 and a compression coil spring 4, a release pad 35 for releasing or disengaging the locked state of the reel 32, a slide door 6 for opening and closing a tape-leading opening 1C which extends over the lower half 1A and the upper half 1B of the cartridge case 1, a torsion coil spring 7 for urging the slide door 6 to close the tape-leading opening 1C, a safety lug 8, and a cartridge memory chip 9.

Figure 13:
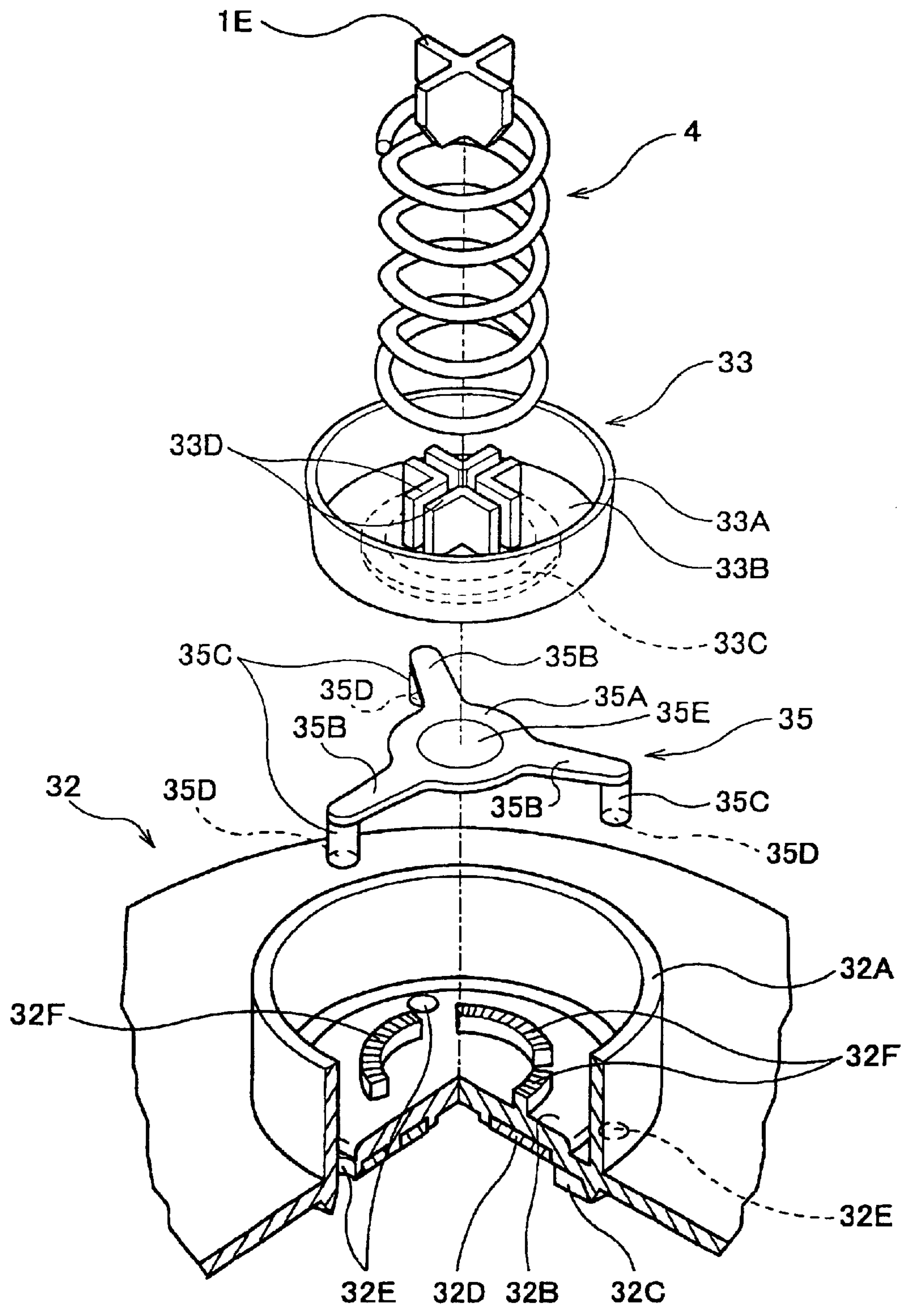
FIG. 13 is an enlarged exploded perspective view illustrating a main structure of the magnetic tape cartridge shown in FIG. 12.
Figure 14:
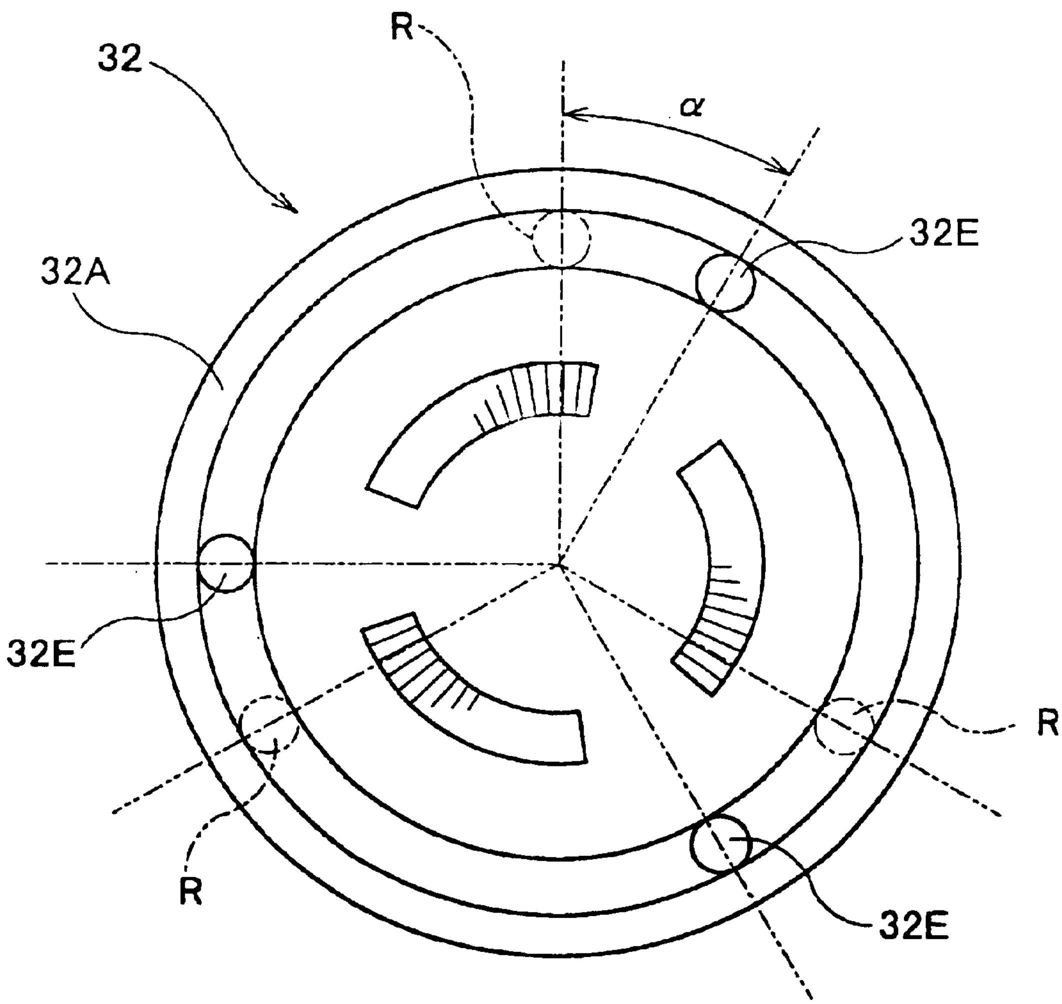
FIG. 14 is a plan view illustrating an interior of a cup-shaped hub of a reel shown in FIG. 13.
Figure 15:
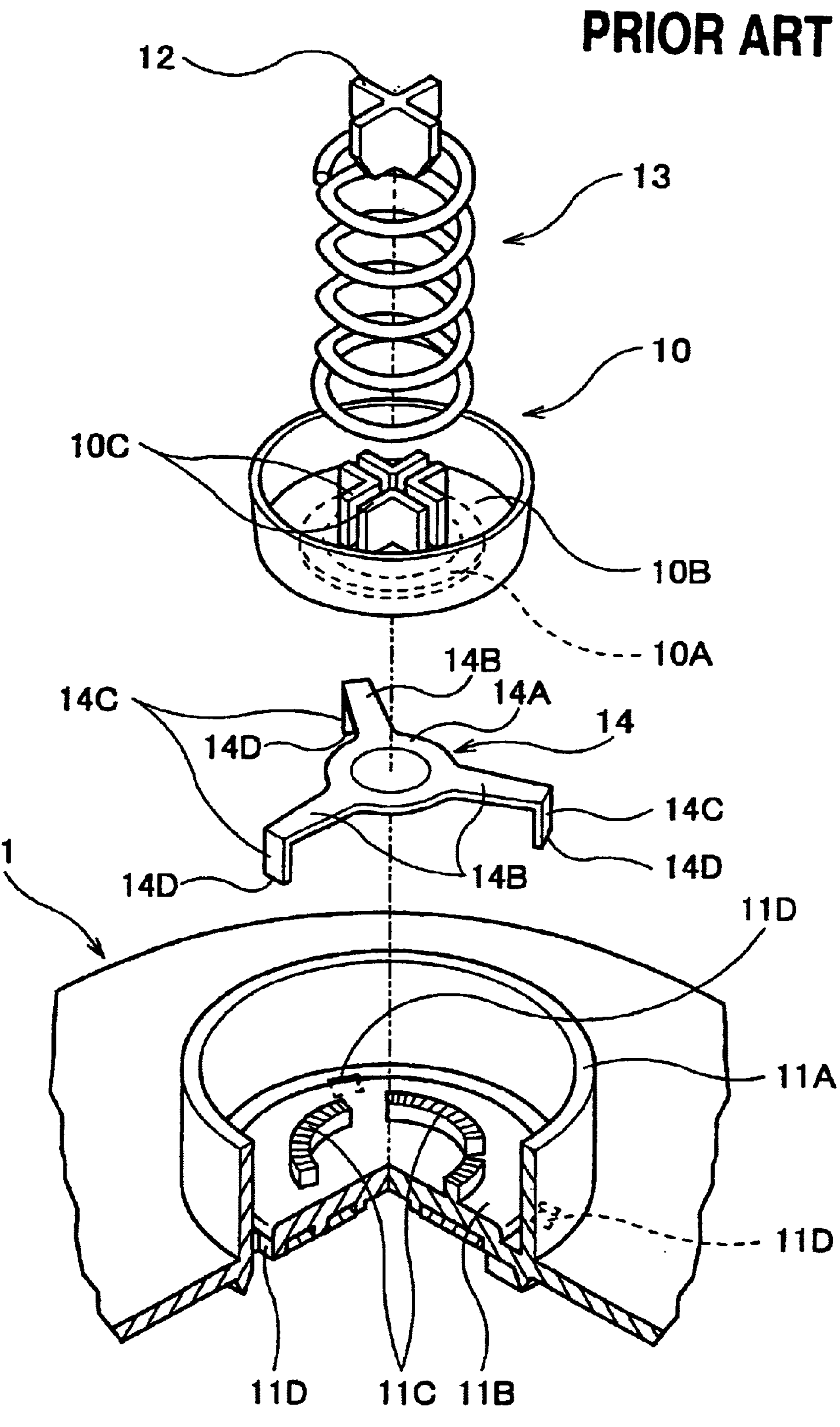
FIG. 15 is an enlarged exploded perspective view illustrating a main structure of a conventional magnetic tape cartridge.

As shown in FIG. 13, the reel 32 includes a cup-shaped hub 32A at its center. As shown in FIG. 12, the cup-shaped hub 32A opens toward the upper half 1B, and the release pad 35, the lock plate 33, and the compression coil spring 4 are in turn assembled in the cup-shaped hub 32A. The bottom surface of the bottom portion 32B of the cup-shaped hub 32A is exposed to view from the cartridge case 1 through a circular opening 1D (FIG. 12) formed at the center of the lower half 1A, and a contrate gear 32C is formed around the lower periphery of the bottom portion 32B. The contrate gear 32C is meshed with a contrate gear of a reel driving mechanism accommodated in a non-shown drive device, into which the magnetic tape cartridge is inserted, and drives the reel 32. A metal plate 32D is inserted within the contrate gear 32C so as to be magnetically attracted by a magnet of the non-shown drive device.

At the bottom portion 32B of the cup-shaped hub 32A of the reel 32, there are provided three circular through-holes 32E. The through-holes 32E are arranged at equal intervals along a certain circumference with a predetermined radius based on the LTO standard and proximately to the inner peripheral wall of the cup-shaped hub 32A. The through-holes 32E are formed within the width of the contrate gear 32C. Further, at the upper periphery of the bottom portion 32B of the cup-shaped hub 32A, three engaging portions 32F project along and within the three through-holes 32E.

The lock plate 33 includes a cup-shaped plate body 33A to be accommodated within the cup-shaped hub 32A of the reel 32, and at the bottom periphery of its bottom portion 33B, there is provided a hub-side engaging portion 33C engagable with the three engaging portions 32F. Further, the plate body 33A is provided at the upper center of the bottom portion 33B with four half-side engaging projections 33D, into which a crisscross projection 1E formed at the center of the upper half 1B (FIG. 12) is inserted. A compression coil spring 4 is fitted onto the half-side engaging projections 33D and positions between the upper half 1B and the lock plate 33, so that the lock plate 33 is urged downward and the hub-side engaging portion 33C thereof engages with the three engaging portions 32F of the cup-shaped hub 32A.

The release pad 35 includes a pad body 35A substantially in the form of a circular plate, and three arms 35B extending from the pad body 35A and each equispaced to the adjacent arms 35B. Provided at the front end of each arm 35B is a downwardly extending lock releasing pin 35C. The lock releasing pins 35B are in the form of tubes, and the outer profile of the lower end surface 35D of each lock releasing pin 35C is circular in shape. The three arms 35B of the release pad 35 are positioned among the three engaging portions 32F upwardly projecting from the bottom portion 32B of the cup-shaped hub 32A, and at the same time, the lock releasing pins 35C thereof are inserted into the corresponding circular through-holes 32E formed in the bottom portion 32B of the cup-shaped hub 32A. Further, a spherical projection 35E is formed at the center of the pad body 35A. The spherical projection 35E engages with a non-shown spherical recess formed at the bottom center of the bottom portion 33B of the lock plate 33.

Next, of the assembling operations of the aforementioned magnetic tape cartridge, the assembling operation of the release pad 35 with respect to the cup-shaped hub 32A of the reel 32 will be described. As the drawings to be referred herein, FIG. 14 is a plan view illustrating an interior of the cup-shaped hub 32A of the reel 32.

In the assembling operation wherein the release pad 35 is assembled with respect to the cup-shaped hub 32A of the reel 32, the lower half 1A assembled with a various parts such as the reel 32 is placed on a non-shown parts-transferring pallet and carried by a belt conveyor. The lower half 1A carried by the belt conveyor is stopped in a certain predetermined position near the non-shown robot. As shown in FIG. 14, a non-shown image-processing camera positioned above this certain predetermined position pictures the through-holes 32E formed in the cup-shaped hub 32A of the reel 32. In this event, no matter where these through-holes 32E are located, the camera pictures the through-holes 32E as circular holes. The center point of each through-hole 32E to be pictured by the camera is calculated by a non-shown image-processing device, and based on each calculated center point, an angle $\alpha$ is calculated as a deviation angle from the regular position R, for example, in the clockwise direction. Therefore, in order to correct the deviation angle which corresponds to the thus calculated angle $\alpha$, a non-shown device positioned below the belt conveyor rotates the reel 32 in the counterclockwise direction by the deviation angle of $\alpha$ and carries positioning.

The robot holds the release pad 35, which is previously positioned and placed on a parts-transferring pallet, and inserts the release pad 35 into the cup-shaped hub 32A of the reel 32 for which the positioning has been carried out. The lock releasing pins 35C of the release pad 35 are then inserted into the corresponding through-holes 32E to be positioned in the regular position R, and thereby completing the assembling operation of the release pad 35 with respect to the cup-shaped hub 32A of the reel 32.

In the aforementioned magnetic tape cartridge according to the third embodiment, the following advantages are obtained.

Since the image-processing camera always pictures the through-holes 32E of the reel 32 as circular holes, a center calculating method of the through-holes 32E becomes simple. This facilitates preparation of a program for image processing. Furthermore, since the shape of each lock releasing pin 35C of the release pad 35 is tubular, a smooth insertion of the lock releasing pins 35C into the through-holes 32E of the reel 32 is achieved.

It is to be understood that the magnetic tape cartridge according to the third embodiment is not limited to this particular type, and various changes and modifications can be made without departing from the spirit and scope of the appended claims. In this embodiment, the through-holes 32E of the cup-shaped hub 32A of the reel 32 are firstly applied to an image processing, and then positioned with the rotation of the reel 32. However, the present invention is not limited to this type. For example, the positioning may be carried out by rotating the release pad. In this instance, the image-processing device calculates the position of the through-holes to be pictured by the image-processing camera, and the calculated data is transmitted to the robot. Based on this transmitted data, the robot rotates in a certain direction the lock releasing pins of the release pad toward the through-holes of the reel by a certain amount. Even in this instance, since the through-holes of the reel are pictured by the image-processing camera, the advantages obtained by this constitution are the same as those described in the third embodiment. Further, since it is not necessary to rotate the reel, no reel-rotating device is required, which leads to reducing the manufacturing cost.

Furthermore, in the third embodiment, the image processing is applied to the through-holes 32E of the cup-shaped hub 32A. However, the present invention is not limited to this particular type. For example, the image processing is applied to the lower end surfaces of the lock releasing pins of the release pad. In this instance, the reel which is assembled in the lower half has to be positioned in advance. Furthermore, in order to picture the release pad from the bottom, a part of a parts-transferring pallet is made of a transparent material such as glass, and the release pad has to be placed on the glass surface. According to this configuration, the image-processing device calculates positions of the lower end surfaces of the lock releasing pins pictured by the image-processing camera, and the calculated data is transmitted to the robot.

Based on the transmitted data, the robot holds the release pad at predetermined points. The release pad is placed on a parts-transferring pallet without positioning. The robot is controlled such that the lock releasing pins of the release pad held by the robot are positioned with respect to the through-holes of the reel carried, to which the positioning has been applied in advance. Subsequently, the robot assembles the release pad with respect to the cup-shaped hub of the reel. Even in this instance, as long as the lower end surfaces of the lock releasing pins are circular in shape, the advantages obtained by this constitution are the same as those described in the third embodiment.

Moreover, both the through-holes of the reel and the lock releasing pins of the release pad may be positioned by means of image processing. Of course, the advantages obtained by this constitution are the same as those described in the third embodiment.

In the third embodiment, the through-holes 32E formed in the cup-shaped hub 32A of the reel 32 and the lower end surfaces 35D of the lock releasing pins 35C of the release pad 35 are both circular in shape. However, the present invention is not limited to this particular type, and for example, if at least either the through-holes or the lower end surfaces of the lock releasing pins are circular, the other ones may have any shape. For example, if the through-holes are circular in shape, the previously positioned lock releasing pins with a rectangular section like the conventional release pad are inserted into the through-holes of the reel, which have been positioned to the regular position by means of image processing. Of course, the number of the through-holes formed in the hub of the reel, the number of the lock releasing pins of the release pad, constitutions of the release pad and the reel may vary when necessary.

What is claimed is:

1. A magnetic tape cartridge comprising:

a reel around which a magnetic tape is wound;

a cartridge case for accommodating the reel in a locked state; and a release pad inserted into a cup-shaped hub of the reel and releasing the locked state of the reel, the release pad including a pad body having a plurality of corners to be faced proximately to the inner peripheral surface of the cup-shaped hub, and a plurality of lock releasing pins projecting downwardly from a bottom surface of the pad body at the respective corners and inserted through a bottom surface of the cup-shaped hub, wherein said release pad is provided with a flank extending from each corner downwardly through the respective lock releasing pin so that an assembling clearance is formed with respect to an inner periphery of a flange positioned in an open side of the cup-shaped hub when the pad body is in linear alignment with the flange.

2. The magnetic tape cartridge according to claim 1, wherein the flank is formed as a flat surface extending along an axial direction of each lock releasing pin, such that each lock releasing pin has a semi-cylindrical shape.

* * * * *